Figure 1:
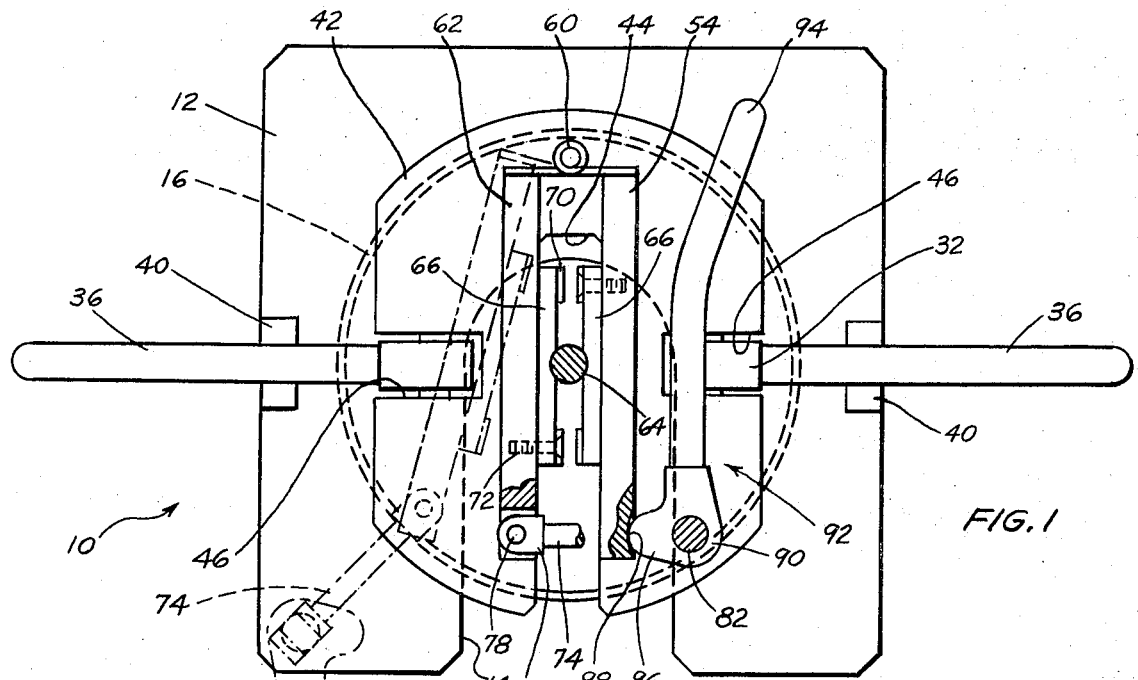

United States Patent [19]
Gustavson et al.

[11] 3,791,612
[45] Feb. 12, 1974

[54] DEVICE FOR GRIPPING AND IMPARTING SLACK IN A CABLE

[75] Inventors: Carl A. Gustavson, Verona; Emmett B. Shutes, Turtle Creek; Paul C. Wuenschel, Glenshaw, all of Pa.

[73] Assignee: Gulf Research & Development Company, Pittsburgh, Pa.

[22] Filed: May 25, 1972

[21] Appl. No.: 256,780

[52] U.S. Cl............ 248/49, 24/132 AT, 24/134 R, 248/56, 254/164
[51] Int. Cl.............................................. G01v 1/24
[58] Field of Search............. 248/49, 54 CS, 51, 52; 24/73 C, 73 SA, 132 R, 115 R, 132 AT, 134 M, 134 R; 256/37; 285/409, 138, 145; 173/166; 188/67; 254/29 R, 30, 134.3, 164, 161

[56] References Cited
UNITED STATES PATENTS

| | | | |
|---|---|---|---|
| 2,527,402 | 10/1950 | Davis | 256/37 |
| 2,002,977 | 5/1935 | Carr | 24/134 R |
| 2,584,282 | 2/1952 | Nelson | 24/134 R |
| 2,706,648 | 4/1955 | Gosse | 285/409 |
| 2,545,627 | 3/1951 | Moore | 173/166 |
| 141,706 | 8/1873 | Downing | 24/115 R |
| 3,075,745 | 1/1963 | Schlein | 254/161 |
| 1,789,771 | 1/1931 | Peppard | 285/145 |

*Primary Examiner*—Roy D. Frazier
*Assistant Examiner*—Rodney H. Bonck

[57] ABSTRACT

A device for clamping and supporting a cable, usually vertically, and imparting a predetermined amount of slack into the cable, comprising clamping means and means to lower the entire clamping means a predetermined amount corresponding to said predetermined amount of slack.

7 Claims, 6 Drawing Figures

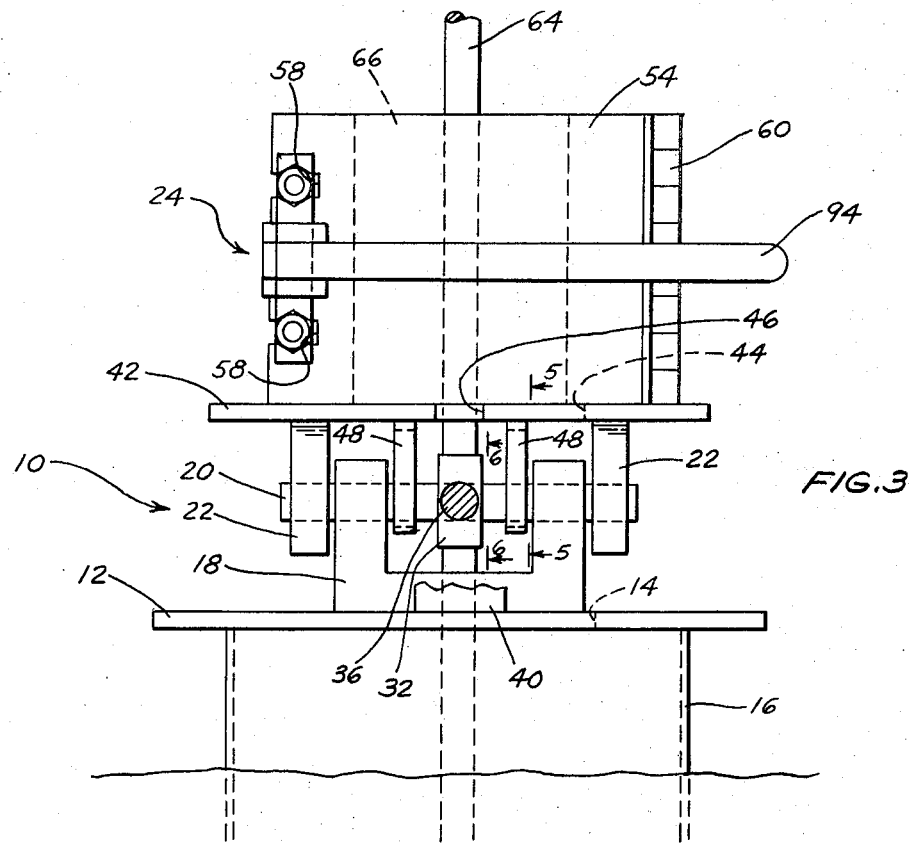
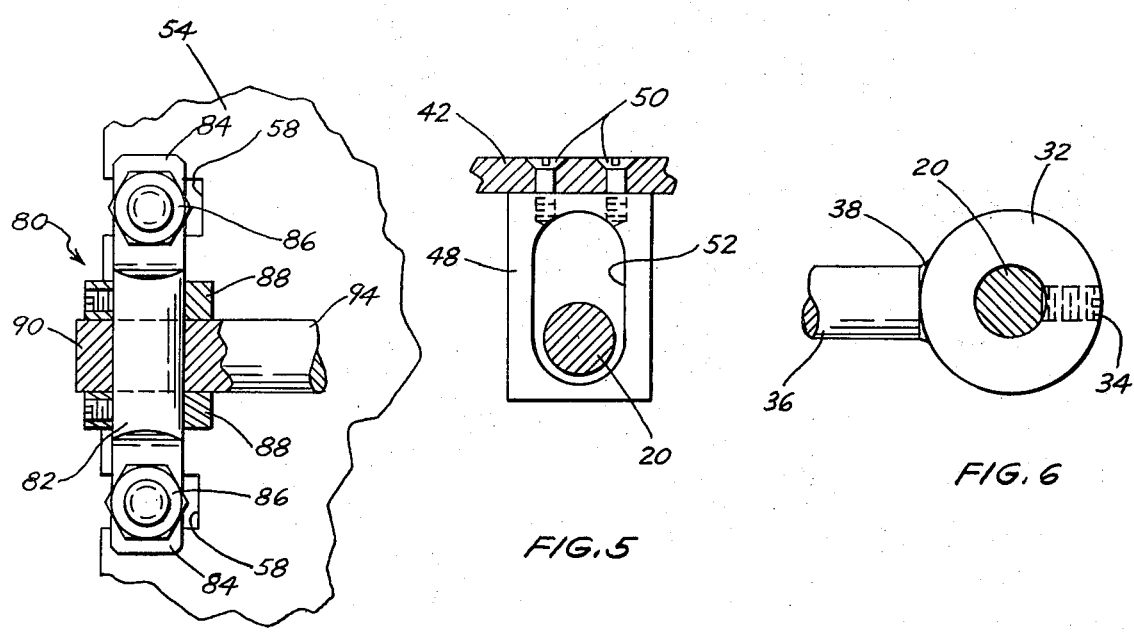

3,791,612

DEVICE FOR GRIPPING AND IMPARTING SLACK IN A CABLE

This invention pertains to means for supporting a cable and for providing a predetermined amount of slack in the cable. The invention was developed in the field of geophysical exploration, particularly seismic exploration.

The present invention is one of a family of related inventions all pertaining to improvement of the seismic method. The related inventions, all co-pending with the present invention and all assigned to the same assignee, are:

"Clamped Detector" by Carl A. Gustavson, Emmett B. Shutes and Paul C. Wuenschel, Ser. No. 255,229, filed May 19, 1972.

"Precision Seismology" by Paul C. Wuenschel, Ser. No. 227,985, filed Feb. 22, 1972.

"Reproducible Shot Hole" by Paul C. Wuenschel, Ser. No. 82,907, filed Oct. 22, 1970, now U. S. Pat. No 3,693,717.

The invention entitled "Precision Seismology" identified above is an overall method of using the present invention as well as the other inventions in a single integrated seismic exploration system. The present and the other inventions, however, do have utility other than use in that particular system. With regard to the present invention, aside from the seismic area, utility possibly could be found in the field of handling of suitably shaped radioactive materials, for example, moving rods with respect to cores.

The invention of the application entitled "Clamped Detector" identified above, comprises a two-part downhold device, with the lower part containing the means to clamp to a borehole wall, and the upper part containing electronics and other utilities. The functions of the present invention with regard to that instrument in that system are to support the substantial weight of the clamped detector and its cable, and, additionally, to lower to upper unit with respect to the lower unit after the lower unit is clamped to the borehole wall. This slack is required to isolate the lower clamped unit from the upper unit and the cable so that this lower unit responds only to seismic vibrations it receives through the earth and not to any shocks or other forces which could be transmitted to it were the cable taut. The various detectors are, of course, in this lower unit.

Prior known devices for moving cables, rods, and the like with the use of friction almost invariably depend upon shoes, dogs, jaws or the like elements which serve three functions. These elements first grip, and then move, and then hold the work. This sort of element, a multi-purpose shoe, dog, jaw, or the like suffers from the disadvantage that in performing these different functions is must either grip the work so tightly or mar it, or else it must grip the work lightly enough to not cause such harm and will then run the risk of slippage or of improper performance of one or more of the multiple functions. In the present invention these problems are avoided in that the gripping means serve only to grip and hold the cable, and therefore they are large enough that a substantial force can be applied to the cable over this relatively large area to thus avoid any damage to the cable. The motion of slack is imparted into the cable by movement of the entire gripping assembly, with no disturbance whatsoever to the friction grip of the clamping means on the cable.

The invention includes a base plate on which is fixed the cable clamping assembly. The clamping plates are hinged about a vertical axis to facilitate their opening and closing to move a cable therebetween. The clamping assembly includes adjustable camming tightening means to assure a tight grip on the cable.

The entire clamping assembly is mounted on cams which are adapted to lower the assemblage of the clamping plates with the cable therebetween with respect to the main support. The predetermined distance and thus the predetermined amount of slack imparted to the cable is thus controlled by the throw or rise of the cams on the mounting means. Thus, the cable is moved the predetermined amount only, no more and no less.

Thus, there is provided a clamping and slacking device of the character described which is of simple construction, inexpensive to make, versatile for use with many different cables and to impart various different amounts of slack, and yet safe and reliable to a high degree in actual use.

Figure 2:
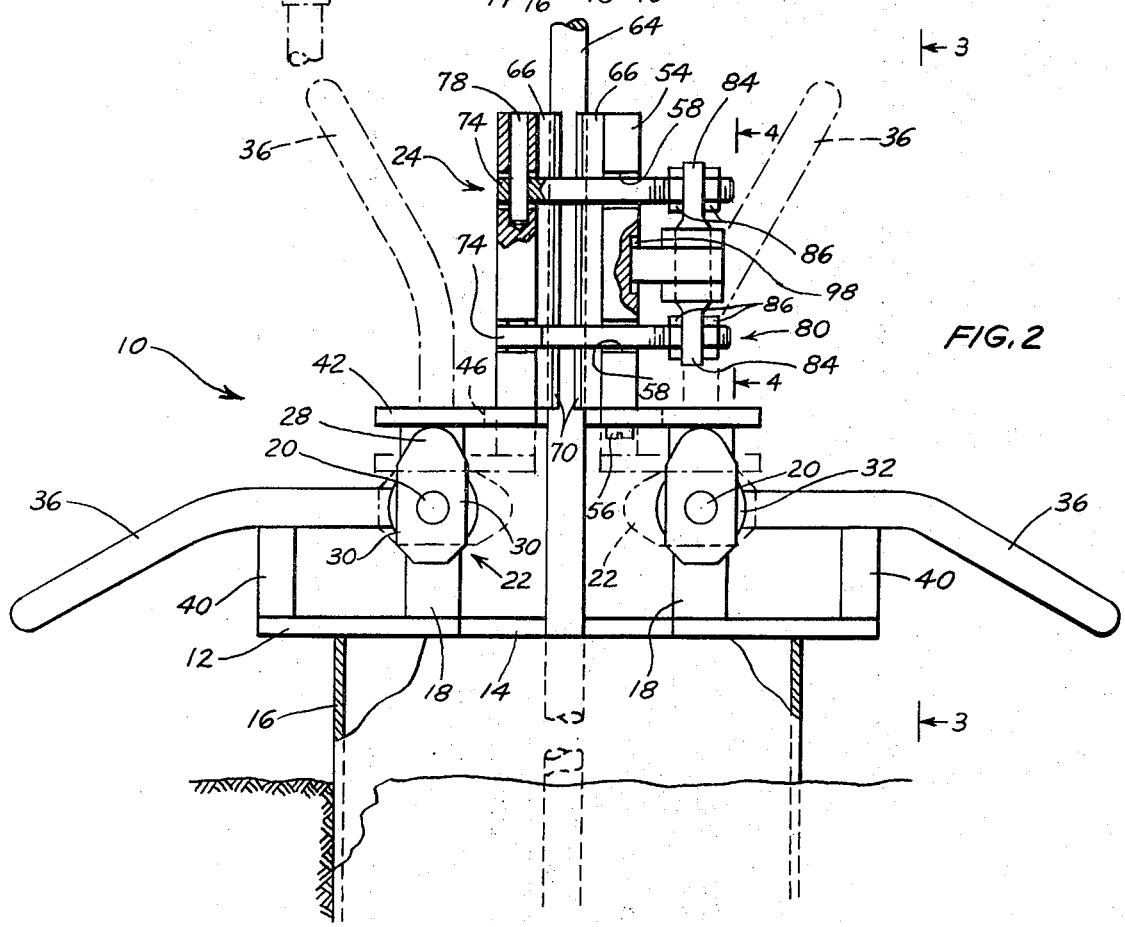

The above and other advantages of the invention will be pointed out or will become evident in the following detailed description and claims, and in the accompanying drawing also forming a part of the disclosure, in which: FIG. 1 is a top plan view of a device embodying the invention and showing the opened up position of the clamping plates in a dot-dash line phantom view, and with some parts broken away and in cross-section for the sake of clarity; FIG. 2 is a front elevational view showing the lowered position of the clamping assembly in a dot-dash line phantom view, an with some parts broken away and in cross-section for the sake of clarity; FIG. 3 is a side elevational view taken generally on line 3—3 of FIG. 2; FIG. 4 is an elevational view of a detail taken on line 4—4 of FIG. 2 with some parts broken away and in cross-section; and FIGS. 5 and 6 are cross-sectional views of two other details taken on line 5—5 and 6—6 respectively of FIG. 3.

Referring now in detail to the drawing, there is shown an apparatus 10 embodying the invention. Device 10 is built upon a main plate 12 which, as is best seen in FIG. 1, is of generally square configuration and is formed with a respectively large centrally disposed cut-out 14. The plate 12 rests on the top end of a surface pipe or the like 16 which, in the seismic field, defines and protects the hole in which work is being done. The pipe or the like 16 is a support and does not per se form a part of this invention. On each side of the cut-out 14 a yoke block 18 is mounted to the main plate 12 by any suitable means such as screws or welding or the like. As shown in FIG. 3, the yoke blocks 18 are of generally "U" configuration, and each block rotatably mounts a horizontally disposed operating shaft 20. Outboard of the arms of the yoke block 18, each end of the shaft 20 carries an operating cam 22. Thus there is provided a total of four operating cams 22, two on each shaft 20 on each side of cut-out 14.

The cable clamping assembly 24 is moved towards and away from, usually up and down, with respect to the two shafts 20 by the action of these cams 22. This action is shown best by a comparison of the solid and phantom views of FIG. 2. Each cam comprises a nose portion 28 and a pair of flat sides 30. The distance between the outside flat side 30 and the centerline of the shaft 20 determines the lowermost position of the clamping assembly 24, as shown in FIG. 2, and the distance between the end of the nose portion 28 and said centerline determines the highest position of the clamping assembly, and, obviously, the difference between these two positions determines the stroke or the amount of slack imparted to the cable. Thus, as is now apparent, different cams can be provided in order to provide a different stroke and thus a different predetermined amount of slack, within the limits set by the guide means, as will be described below.

Means are provided to manually turn or operate shafts 20 in the yokes 18 and to operate the cams 22. To this end, referring to FIGS. 3 and 6, a collar 32 is fitted on shaft 20 and is secured thereto by means of a set screw 34 which cooperates with a suitably formed flat on the surface. The operating means comprise a handle member 36 secured to the collar 32 by any suitable means such as a weld bead 38. Outboard of the yokes 18 along the opposite side edges of the main plate 12 there is provided a pair of stop blocks 40 to limit the downward motion of the handle members 36 as shown in FIG. 2. These blocks 40 may be secured to the plate 12 by any suitable means or in the same manner as the blocks 18.

The clamping assembly 24 is built upon a clamping assembly base plate 42 which is formed with a central cut-out 44 which overlies and is centered over the cut-out 14 in the main plate 12. The base plate 42 is formed with a pair of side cut-outs 46 for the purpose of providing clearance for the handles 36 in their operating action as shown in the solid and phantom views of FIG. 2.

Means are provided to mount the base plate 42 and all the clamping apparatus thereon on the shafts 20 and to permit the cable slacking motion of this entire clamping assembly 24. To this end, referring to FIGS. 3 and 5, plate 42 carries a pair of guide and retaining members 48, each of which is secured to the plate 42 by suitable means such as the screws 50. Each guide member 48 is formed with a central elongated opening 52, the length of which defines the maximum possible limits of the motion of the clamping assembly 24 with respect to the shafts 20 as driven by the cams 22. The members 48 do not function during normal operation, but serve as safety retainers.

The cable clamping means proper comprise a fixed plate 54 secured to the main plate 42 by any suitable means such as screws 56. The fixed clamping plate is positioned at the edge of the cut-out 44, and at its front end (the left side as shown in FIG. 3) it is formed with a pair of slots 58 which serve a function described below. At the right end of the fixed plate 54 there is provided a hinge member 60 by which the fixed plate is joined to the movable clamping plate 62. Member 60 is preferably of the piano hinge variety, and has its legs joined to the vertical rear edges of the two plates 54 and 62 by any suitable means such as screws, welding, or the like.

Means are provided to tightly grip a cable between the plates 54 and 62 while at the same time avoiding crushing of such a cable. A cable upon which the invention may operate is indicated by reference numeral 64, and this showing is exemplative of many different sorts of cable with which the invention can operate. As mentioned above, it is thought that the invention has utility in areas other than the specific improved seismic exploration system mentioned above. For this reason, therefore, the term "cable" as used in the specification and claims herein, shall be understood to mean any sort of elongated member including rods and the like which can be gripped by the clamping assembly 24. Further, along this line of logic, it is envisioned that the invention would be used almost exclusively with such "cables" which are substantially vertically oriented, but, as is obvious, in a suitable environment, the invention would work equally well on a cable having some other orientation, although the cable would have to have at least some vertical component of its orientation in order for gravity to assist in the motion. Further, more broadly, the device can work in any orientation provided there is tension in the cable holding the device onto the support equivalent to 16. Carrying this logic to its extreme, the invention could operate upside-down.

The actual cable gripping members are a pair of pads 66 which are made of rubber, plastic or neoprene, or other suitable material to firmly grasp the cable but not harm it. The pads 66 may be formed with concavities of arcuate configuration to snugly contact the cable 64, which cables will almost always be of round cross-section. Plain flat pads can also be used. The gripping or friction pads 66 are held onto the clamping plates 54 and 62 by means of elongated hold down members 70 which overlie the vertical side edges of the pads 66. A plurality of screws 72 are provided in suitably formed openings in the members 70 and the gripping pads 66, and mate with suitably formed blind threaded holes in the clamping plates 54 and 62. As is clear from FIG. 1, th thickness of the members 70 together with the depth of the concavities substantially determine the minimum space possible between the gripping pads 66 around a cable. Different pad thicknesses can be used with different cables, as is obvious. It is preferred that the parts be configured when gripping a cable as shown in FIG. 1 with the movable plate 62 lined up with its associated edge of the cut-out 44, but additional versatility is provided in that this plate 62 can move slightly to the right of the solid line position in FIG. 1 to thereby accommodate smaller cables temporarily or in an "emergency" situation. Such use is not recommended because the cable gripping force is not uniform.

Means are provided to firmly urge and clamp the pads 66 together around a cable. To this end, movable plate 62 is provided with a pair of swing pins 74 which are pivotally mounted about a vertical axis in the movable plate 62, and which fit in the slots 58 in the fixed plate 54. Each swing pin 74, referring to FIG. 1, has an enlarged pivot end portion 76 which is formed with a suitable opening to snugly and rotatably receive a pivot pin 78. The pivot pins are fixed into suitably formed openings extending from the upper and lower edges of the movable plate 62. The pivot ends 76 move in suitably formed slots in the edge portion of the movable plate which also receive the pivot pins at right angles thereto. The phantom view of FIG. 1 shows the position of the plate 62 and the swing pins 74 thereon when the plates are open for insertion or removal of a cable therebetween. The means to urge the plates together comprises a tightening assembly 80, see FIGS. 2 and 4, mounted on the outer threaded ends of the two swing pins 74. Assembly 80 comprises a cross pin member 82 having flattened ends 84 which are formed with openings adapted to receive the ends of the swing pins. The position of the cross member 82 on the pins 74 is controlled by a pair of nuts 86 positioned one nut of each pair to each side of each flattened portion 84. A pair of set screw collars 88 on the round center shank portion of the cross member 82 serve to locate the head portion 90 of a tightening and locking cam member 92 on the cross member. Member 92 further comprises a handle portion 94 joined to the head portion 90 by any suitable means such as a screw connection, welding, or the like. Head portion 90 is formed with a camming nose portion 96 which is adapted to bear against a concavity 98 formed in the face of the fixed plate 54 between the pair of slots 58 formed in an edge thereof. The region of concavity 98 serves as a detent and may be hardened for better wear characteristics.

In operation, the tool is first located on a surface pipe or other support such as is generally indicated at 16, with th arms 36 in the position shown in solid lines in FIG. 2. An advantage of the invention is provided by the two cut-outs 14 and 44 along with the structure of the movable plate 62 and the swing pins 74 which permit use of the invention after the cable is in place, as opposed to other devices which may require threading a cable. The cable is positioned between the concavities, the swing pins 74 carrying the tightening assembly 80 is closed onto the cable, and the parts moved to the solid line position shown in FIG. 1. When the handle 94 of the locking cam member 92 is brought to its solid line position, the nose portion 96 bears against the concavity 98 thus urging the plates together with great force because of the camming action. The amount of force and the final position of the gripping pads 66 on the cable is determined by the positions of the nuts 86 on the threaded outer ends of the pins 74. Now the cable is firmly gripped and held. It is an important advantage of the invention, as opposed to prior devices which depend upon a single member or the same set of members to both grip the cable and to move it, that the grip on the cable of the clamping pads 66 is never disturbed, but the entire cable clamping assembly 24 is moved with respect to the main plate 12. This motion is readily accomplished by rotation of the handle members 36 from the solid to the phantom position in FIG. 2. The stroke or amount of slack is determined by the configuration of the operating cams 22 as described above.

While the invention has been described in detail above, is it to be understood that this detailed description is by way of example only, and the protection granted is to be limited only within the spirit of the invention and the scope of the following claims.

We claim:

1. Apparatus for gripping, imparting a predetermined amount of slack into, and holding a cable comprising a main plate, an opening through said main plate to receive the cable and through which the cable passes, a pair of mounting yoke blocks mounted on the main plate and extending therefrom one on each side of the opening, a shaft rotatable in each of said yoke blocks, a cam mounted on each of said shafts, a base plate spaced from the main plate in position for engagement with the cams, a cut-out in the base plate through which the cable passes, guide means mounted on said base plate and extending toward the main plate, said guide means having slots therein through which the shaft extends, a clamping assembly to grip and hold the cable mounted on the base plate, and manual operating means to turn the shafts with said cam means thereon to thereby move said clamping assembly with said cable gripped therein with respect to the shafts.

2. The combination of claim 1 wherein the guide means comprise a pair of guide and retaining members for each shaft and the slots in the guide means determine the maximum possible predetermined amount of slack which can be imparted to a cable gripped in the clamping assembly.

3. The combination of claim 1 wherein said manual operating means comprise an elongated handle secured to each of said shafts whereby rotating said elongated handles about the shafts as an axis turns the shafts and the cams thereon.

4. The combination of claim 3 wherein the clamping assembly comprises a clamping plate secured to said base plate to one side of the cut-out therein, a movable clamping plate joined to said clamping plate by hinge means having an exis disposed perpendicular to the base plate, means urging said movable clamping plate toward said fixed clamping plate, and the base plate is formed with cut-out means to clear the elongated handles.

5. The combination of claim 1 wherein said base plate rests on a first portion of said cams before said slack is imparted to said cable and said first portion is a first distance away from said shafts, said base plate rests on a second portion of said cams after said slack is imparted to said cable and said second portion is a second distance away from said shafts, and the difference between said first and second distances determine the predetermined amount of slack imparted to said cable.

6. The combination of claim 5 wherein one of said first and second cam portions comprises a flat side on said cam and the other portion comprises an elongated nose on said cam.

7. The combination of claim 1 wherein said clamping assembly comprises a clamping plate fixed to said base plate on one side of said cut-out therein, a movable clamping plate joined to said fixed clamping plate by hinge means having an axis disposed perpendicular to the base plate, and means for urging said movable clamping plate toward said fixed clamping plate.

* * * * *